United States Patent
Duruoz et al.

(10) Patent No.: US 7,178,152 B2
(45) Date of Patent: Feb. 13, 2007

(54) APPLICATION PROGRAMMING INTERFACE FOR COMMUNICATION BETWEEN AUDIO/VIDEO FILE SYSTEM AND AUDIO VIDEO CONTROLLER

(75) Inventors: Ibrahim Cem Duruoz, San Francisco, CA (US); Kosuke Nakai, Kanagawa (JP); Natarajan Sundaresan, Santa Clara, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 708 days.

(21) Appl. No.: 10/005,884

(22) Filed: Dec. 3, 2001

(65) Prior Publication Data
US 2003/0009605 A1 Jan. 9, 2003

Related U.S. Application Data

(60) Provisional application No. 60/272,863, filed on Mar. 1, 2001.

(51) Int. Cl.
*G06F 13/00* (2006.01)
(52) U.S. Cl. .................................... 719/328
(58) Field of Classification Search ............... 719/328, 719/310, 313
See application file for complete search history.

(56) References Cited

U.S. PATENT DOCUMENTS

| | | | |
|---|---|---|---|
| 6,199,136 B1 * | 3/2001 | Shteyn | 710/305 |
| 6,701,383 B1 * | 3/2004 | Wason et al. | 719/328 |
| 6,732,365 B2 * | 5/2004 | Belknap et al. | 719/328 |
| 6,816,904 B1 * | 11/2004 | Ludwig et al. | 709/226 |
| 6,859,610 B1 * | 2/2005 | Blumel et al. | 386/46 |
| 6,961,943 B2 * | 11/2005 | Miller et al. | 719/328 |
| 6,965,925 B1 * | 11/2005 | Shank et al. | 709/219 |
| 2002/0087741 A1 * | 7/2002 | Ing et al. | 709/328 |
| 2002/0099840 A1 * | 7/2002 | Miller et al. | 709/231 |

* cited by examiner

*Primary Examiner*—William Thomson
*Assistant Examiner*—Andy Ho
(74) *Attorney, Agent, or Firm*—Brian N. Young; Trellis Intellectual Property Law Group, PC

(57) ABSTRACT

The present invention is directed to an application programming interface. More specifically, the present invention relates to an application programming interface designed for handling interaction between an audio/video controller and an audio/video file system. In one exemplary embodiment, the application programming interface includes a number of function calls which direct the audio/video file system to perform a variety of functions. In addition, the application programming interface permits devices capable of handling different types of data, such as isochronous and asynchronous data, to communicate with the audio/video file system.

58 Claims, 1 Drawing Sheet

APPLICATION PROGRAMMING INTERFACE FOR COMMUNICATION BETWEEN AUDIO/VIDEO FILE SYSTEM AND AUDIO VIDEO CONTROLLER

CROSS-REFERENCES TO RELATED APPLICATION(S)

The present application claims the benefit of priority under 35 U.S.C. §119 from U.S. Provisional Patent Application Ser. No. 60/272,863, entitled "APPLICATION PROGRAMMING INTERFACE FOR COMMUNICATION BETWEEN AUDIO/VIDEO FILE SYSTEM AND AUDIO/VIDEO CONTROLLER" by Duruoz et al., filed Mar. 1, 2001, the disclosure of which is hereby incorporated by reference in its entirety for all purposes.

The present application is related to the following co-pending, commonly assigned applications including: U.S. Provisional Patent Application Ser. No. 60/272,798, entitled "APPLICATION PROGRAMMiNG INTERFACE FOR COMMUNICATION BETWEEN AUDIO/VIDEO FILE SYSTEM AND HARD DISK DRIVE SOFTWARE" by Duruoz et al., filed on Mar. 1, 2001; U.S. patent application Ser. No. 10/005,206 entitled "PROCESS CONTROL MANAGER FOR AUDIO/VIDEO FILE SYSTEM"0 by Duruoz, filed concurrently herewith, which claims the benefit of priority from U.S. Provisional Patent Application Ser. No. 60/272,804, entitled "PROCESS CONTROL MANAGER FOR AUDIO/VIDEO FILE SYSTEM" by Duruoz, filed on Mar. 1, 2001; and U.S. patent application Ser. No. 10/005,204 entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed concurrently herewith, which claims the benefit of priority from U.S. Provisional Patent Application Ser. No. 60/272,864, entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed on Mar. 1, 2001, all of which are incorporated in their entirety by reference herein.

BACKGROUND OF THE INVENTION

With the proliferation of digital audio and video devices, it has become necessary to establish a high speed serial communication mechanism that is capable of allowing efficient and fast transfer of audio/video (A/V) data between devices. IEEE 1394 has so far been a successful candidate for this purpose.

While the transmission of A/V data using industry standard such as IEEE 1394 is well known, the storage of A/V data on modern computing devices is becoming an important issue. Modem computing devices are rapidly moving toward offering various kinds of functionality and features in an integrated manner. For example, a personal computer (PC) nowadays generally contains a myriad of computer programs which offer a variety of functionality, such as word processing programs as well as computer programs which are capable of processing and playing video and audio data. As a result, there is a need to store both A/V data and non-A/V data and both types of data are typically stored on a computer hard disk together.

To store data on the hard disk or other media, a file system is generally required to be in place to organize files and accomplish a number of file-handling tasks such as file creation, deletion, access, save and update. Furthermore, it is preferable and common practice for a file system to have a directory structure which organizes and provides information about all the files stored in the file system. Typically, a file system is capable of storing both A/V and non-A/V data.

A/V data and non-A/V data, however, are fundamentally different in a number of respects. For example, the size of A/V data files is relatively large when compared to the size of non-A/V data files. As a result, handling files of varying sizes in an efficient manner becomes a challenging issue.

Moreover, since A/V data files are generally very large, it is usually not possible to store an entire A/V data file in a temporary storage area such as the random access memory (RAM). Therefore, due to the large size of an A/V data file, efficient random access of A/V data within the A/V data file also presents a problem.

Furthermore, the retrieval and processing of A/V data are subject to relatively stringent time and order-related constraints. Such constraints are necessary to prevent the corruption of A/V data and avoid potential glitches. For example, in order to provide a smooth presentation of video images, A/V data need to be retrieved and processed quickly and continuously in the correct sequential order. Otherwise, the video images might become choppy and incomplete. Hence, it would be desirable to develop and provide an application programming interface between an audio/video controller and a file system capable of handling a mix of A/V and non-A/V data so as to allow A/V data to be stored, retrieved and processed in an efficient manner.

Moreover, changes made to the internal mechanics of a file system should ideally be apparent to any external devices that need to communicate with the file system. This would obviate the need to make changes to the external devices every time the internal mechanics of the file system is changed. Thus, it would also be desirable to develop and provide an application programming interface between an audio/video controller and a file system so that the audio/video controller is not affected by changes to the file system.

SUMMARY OF THE INVENTION

The present invention is directed to an application programming interface (API). More specifically, the present invention relates to an application programming interface designed for handling interaction between an audio/video controller and an audio/video file system.

In an exemplary embodiment, the application programming interface of the present invention includes a number of function calls which direct the audio/video file system to perform a variety of functions. These function calls are described as follows.

A first group of function calls is designed to handle smaller files such as a non-A/V descriptor file. This group of function calls includes a load function call, a store function call, a delete function call, and a validity function call. The load function call is provided to direct the audio/video file system to retrieve desired descriptor information from a storage medium such as a computer hard disk. The store function call is provided to direct the audio/video file system to store specified descriptor information onto the storage medium. The delete function call is provided to direct the audio/video file system to delete specified descriptor information from the storage medium. The validity function call is provided to verify the validity of a specified descriptor.

A second group of function calls is designed to handle larger files such as an A/V file. This group of function calls includes a play function call, a record function call, a stop function call, a pause function call, a resume function call, and an address retrieval function call. The play function call is provided to cause a specified file to be played. The record function call is provided to cause specified data to be recorded onto the storage medium. The stop function call is provided to cause a play or record operation to be stopped. The pause function call is provided to cause a play or record operation to be paused. The resume function call is provided to cause a previously paused operation to resume. The address retrieval function call is provided to determine a logical block address of a specified file.

This second group of function calls further includes additional function calls which allow certain trick plays to be performed, including a fast forward function call, a slow forward function call, a step forward function call, a fast reverse function call, a slow reverse function call, and a step reverse function call. The fast forward function call is provided to cause a data stream to be fast-forwarded. The slow forward function call is provided to cause a data stream to move forward frame-by-frame, or by certain specified increment, with each displayed frame being displayed repeatedly based on a predetermined duration. The step forward function call is provided to cause a data stream to move forward by one or more frames and then return to a pause state. Similarly, the fast reverse function call is provided to cause a data stream to be fast-reversed. The slow reverse function call is provided to cause a data stream to move backward frame-by-frame, or by certain specified increment, with each displayed frame being displayed repeatedly based on a predetermined duration. The step reverse function call is provided to cause a data stream to move backward by one or more frames and then return to a pause state.

The API of the present invention provides a number of advantages. For example, the API supports the handling of large and small files thereby allowing A/V data files and other types of data files to be processed efficiently. The API also supports a variety of features within a file system including scalability to large disks, directory structures and delete, add, record, play and other trick play operations.

Furthermore, the API allows several A/V data streams or the same A/V data stream to be recorded or played concurrently. The API further supports record and play operations starting from within an A/V data file thereby providing more efficient random data access.

Moreover, the API optimizes disk access thereby speeding up the retrieval and handling of data.

In addition, the API permits devices each capable of handling a different type of data, such as isochronous and asynchronous data, to communicate with the audio/video file system. For example, the API can be used by an audio/video controller capable of processing packets transported using the 61883 protocol as well as a serial-bus-protocol-2 controller.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DETAILED DESCRIPTION OF THE INVENTION

Figure 1:
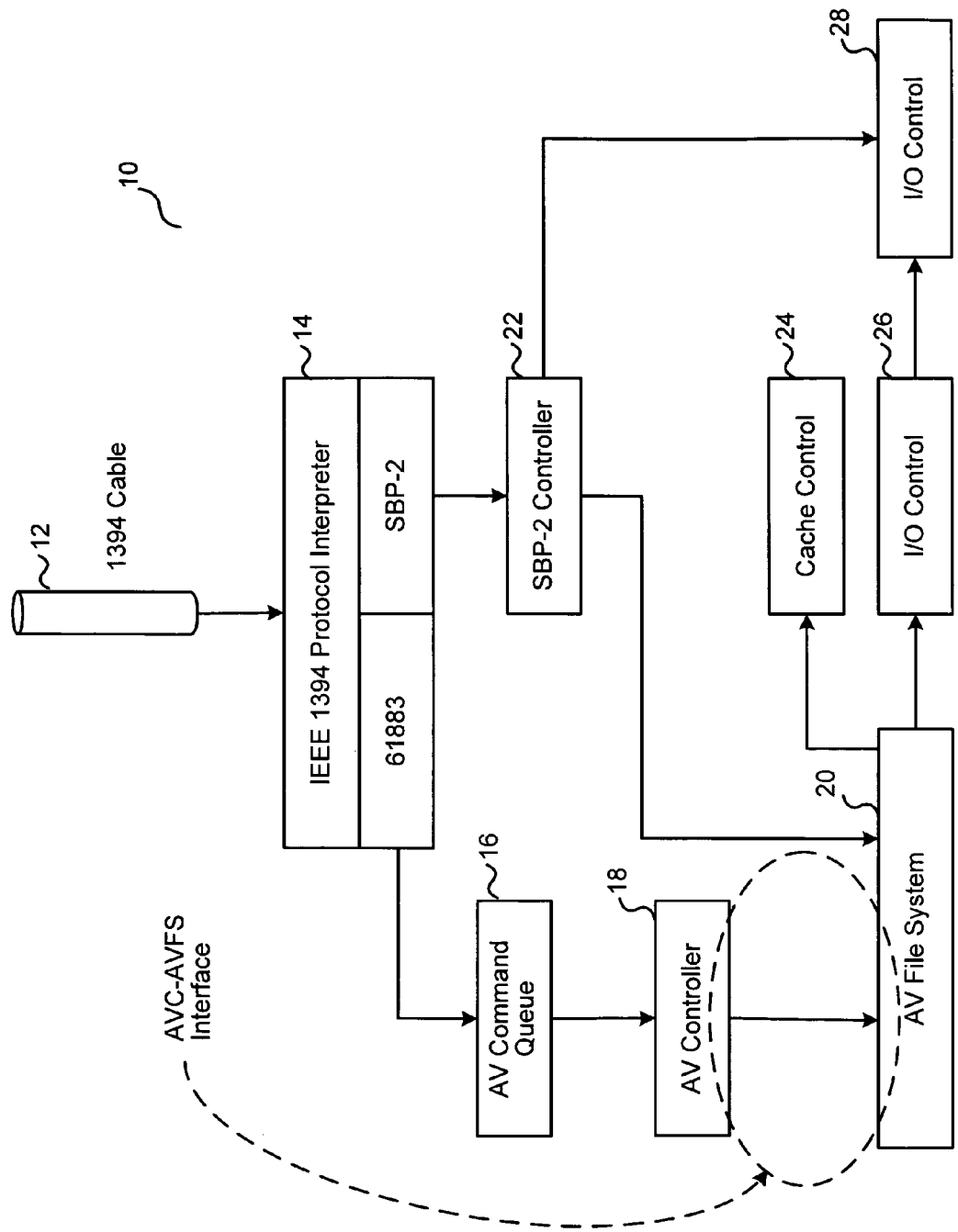
FIG. 1 is a simplified schematic functional block diagram showing the application programming interface in accordance with the present invention.

Exemplary embodiments of the present invention will now be described. FIG. 1 is a simplified schematic functional block diagram showing the application programming interface in accordance with the present invention. FIG. 1 also shows the system architecture of an audio/video (A/V) system 10. The A/V system 10 includes a 1394 cable 12, a protocol interpreter 14, an A/V command queue 16, an A/V controller 18, an A/V file system 20, a SBP-2 controller 22, a cache control 24 and a high-level I/O control 26 and a physical I/O control 28.

The 1394 cable 12 is used to transmit A/V data to and from another device (not shown), such as a video recorder, to the A/V system 10. The 1394 cable 12 is connected to the protocol interpreter 14. A function of the protocol interpreter 14 is to decode an incoming packet received from the 1394 cable 12 and then determine the identity of the transport protocol for such packet. More specifically, the protocol interpreter 14 determines whether the transport protocol for a transmitted packet is the 61883 protocol or the serial-bus-protocol-2 (SBP-2). These two protocols are used to define the data contained in a transmitted packet. The 61883 protocol provides for isochronous transmission of data packets which are usually used for time-critical data, such as video and audio data, as well as asynchronous transmission of control packets; whereas, protocol SBP-2 provides for asynchronous transmission which is generally used for data that are more tolerant of delay, such as text and electronic mails. Typically, the protocol interpreter 14 is implemented using both hardware and software.

Upon determining the identity of the transport protocol for each packet, the protocol interpreter 14 accordingly routes the commands carried by that packet to either the A/V command queue 16 or the SBP-2 controller 22 for further processing. Commands carried by packets which use the 61883 protocol as the transport protocol are routed to the A/V command queue 16, while commands carried by packets which use the SBP-2 protocol are delivered to the SBP-2 controller 22. The A/V data contained in the packets are separately routed to the storage media, such as a hard disk, directly.

A function of the A/V command queue 16 is to provide a staging area to queue up any commands that are awaiting execution. Commands which are ready to be executed are then passed to the A/V controller 18 for execution.

A function of the A/V controller 18 is to determine whether a command to be executed need to invoke the A/V file system 20. In other words, whether the A/V file system 20 is required to perform certain functions pursuant to the command. If it is determined that the A/V file system 20 is to be invoked, the A/V controller 18 uses the appropriate API to interact with the A/V file system 20. Details of the API will be further described below.

The function of the A/V file system 20 is to organize A/V data in such a manner so as to allow efficient data processing and retrieval. In general, the A/V file system 20 organizes the data into files or objects. A descriptor is used to store and provide information on the properties of a specific object or a list of objects. Examples of various types of descriptors used in connection with the API of the present invention are listed in Table 1 below.

In an exemplary embodiment, the API of the present invention interfaces with an audio/video file system. For example, the API of the present invention can be used to interface with A/V file systems such as BSD FFS, Linux ext2, Macintosh HFS, and Windows NT's NTFS etc.

The various types of descriptors listed in Table 1 will now be described. A descriptor of the type "object entry" contains information about an object such as objectID. Each object is assigned a unique objectID so as to allow an object to be identified on an individual basis. For example, if an object contains data for a movie, then the descriptor for that object may contain information about that movie, such as movie length, title, size (e.g., in bytes), and other relevant information etc.

A descriptor of the type "contents list" contains information about a list of objects or a list of one or more lists of objects. Each "contents list" is assigned a unique ListID so as to allow a "contents list" to be uniquely identified. For example, assuming there are a number of objects each containing data for a particular movie, a "contents list" descriptor may contain information about a list of objects (i.e. movies) that fall into a particular category such as action or drama. In another example, a descriptor may contain information about a list of one or more lists of movies. The initial or root list may contain lists of movies from a particular time period like the 1990's and each list contains movies of a particular category from that time period.

A descriptor of the type "performance list" contains information about a list of objects which are related to each another for performance or execution purposes. Similarly, each "performance list" descriptor is assigned a unique ListID so as to allow a particular "performance list" to be uniquely identified. For example, if a movie contains a number of previews, this descriptor may contain information about a list of such previews for that particular movie.

Descriptors of the types "SID" and "DSSD" are used to provide information about the physical storage media accessible to the A/V file system. Via these two descriptors, external devices, such as a video recorder, can obtain information about the physical storage media. "SID" is an acronym for subunit identifier descriptor and "DSSD" is an acronym for disc subunit status descriptor.

A descriptor of the type "HMS table" contains timing and content location information about an object. "HMS" stands for hour, minute and second. For example, if the object is a movie, then such descriptor contains information such as total length of the movie, start and end times of different segments within the movie, and specific disk locations of corresponding time points in the movie, etc.

The use of these descriptors in the API will be explained more fully below.

The A/V file system 20 also interacts with the high-level I/O control 26 and the cache control 24 to allow the physical storage media (not shown) to be manipulated.

The A/V system 10, as shown in FIG. 1, generally operates in the following manner. A/V data, usually in the form of packets, are transmitted through the 1394 cable 12 in accordance with the IEEE 1394 protocol to the protocol interpreter 14. As it is commonly known and understood in the industry, the IEEE 1394 protocol is designed to allow high speed serial transmission of data.

The protocol interpreter 14 then decodes the packets and identifies the pertinent transport protocol for each packet. If it is determined that the transport protocol for a packet is SBP-2, then the commands carried by the packet are processed by the SBP-2 controller 22 and the data are directly stored to or retrieved from the SBP-2 partition of the storage media (not shown) under the control of the physical I/O control 28.

If the protocol interpreter 14 determines that the transport protocol for the packet is 61883 (which means the data component of the packet is transmitted on an isochronous basis and the control component of the packet is transmitted on an asynchronous basis), the commands embedded in the packet is inserted into the A/V command queue 16 to await execution. The A/V controller 18 then processes the commands from the A/V command queue 16 and responds to them depending on their content. Certain commands require functions to be performed by the A/V file system 20. Such functions are effectuated by using the appropriate API described below.

FIG. 1 also shows an exemplary embodiment of the API of the present invention. As shown in FIG. 1, the logic for interpreting and processing the API is resident on the A/V file system 20. The API provides an interface for a driver or application, such as the A/V controller 18, to allow the A/V controller 18 to direct actions to be performed by the A/V file system 20.

The API of the present invention provides the software interface between the A/V controller 18 and the A/V file system 20. This is done by providing an application programming library of function calls independent of the operating system or internal implementation which provides command, data transfer and other capabilities to the A/V controller 18. This layering enables the API to present a consistent interface to the A/V controller 18 and/or other devices even though the underlying structure of the A/V file system 20 should change.

In an exemplary embodiment, the API of the present invention includes a number of operating-system-independent function calls to be made by an operating-system-specific driver, such as the A/V controller 18. The A/V controller 18 uses the API to manipulate or otherwise interact with the A/V file system 20. Table 2 contains a list of these API function calls.

TABLE 1

Descriptor Types

| Type | ID |
| --- | --- |
| Object entry | Object ID |
| Contents list | List ID |
| Performance list | List ID |
| SID | N/A |
| DSSD | N/A |
| HMS table | Object ID |

TABLE 2

API Function Call Summary

| Function | Purpose |
| --- | --- |
| LoadDescriptor ( ) | Retrieve descriptor information from media |
| StoreDescriptor ( ) | Store descriptor information onto media |
| DeleteDescriptor ( ) | Delete descriptor information from media |
| CheckValidityOfID ( ) | Check validity of specified ID value |
| Play ( ) | Play track or object |
| Record ( ) | Record track or object |
| Stop ( ) | Stop track or object under recording or playing |

TABLE 2-continued

API Function Call Summary

| Function | Purpose |
| --- | --- |
| Pause ( ) | Pause current play or record operation |
| Resume ( ) | Start play or record previously paused operation |
| FastForward ( ) | Fast forward a track or object |
| SlowForward ( ) | Forward a track or object by certain specified increment |
| StepForward ( ) | Forward a track by one or more frames and return to pause state |
| FastReverse ( ) | Fast reverse a track or object |
| SlowReverse ( ) | Reverse a track or object by certain specified increment |
| StepReverse ( ) | Reverse a track by one or more frames and return to pause state |
| GetCurrentLBA ( ) | Retrieve logical byte address offset for recorded track or object |

Preferably, each function call of the API of the present invention is capable of passing parameters. Most function calls also return a result code to indicate the result of the function calls. Each function call will now be described in detail.

A first group of function calls is designed to handle smaller files such as a descriptor file. This group of function calls includes the LoadDescriptor function call, the StoreDescriptor function call, the DeleteDescriptor function call, and the CheckValidityofID function call.

The LoadDescriptor function call is used to retrieve descriptor information from the storage media. A sample format for this function call is as follows:

LoadDescriptor (descID, type, offset, size, *p_dest, *cb)

The parameters "descID" and "type" provide information relate to a specified descriptor. The parameter "descID" specifies the assigned identification number of the descriptor that is to be retrieved; and the parameter "type" specifies the type of descriptor that is to be retrieved. As shown in Table 1 above, there are various types of descriptors.

The parameter "offset" specifies the start byte offset value to be used for loading the descriptor data. Preferably, this offset value is a multiple of sectors. A sector is broadly defined as the smallest addressable portion of a storage medium. For example, if the storage medium is a hard disk, then the sector size is typically 512 bytes. By specifying an "offset" value, a user is able to specify the position within the descriptor data where initial loading should begin. For example, if the descriptor is of the type "object entry" and the object entry represents a movie, a user then can, with the aid of this function call, specify the location where the desired descriptor information about the movie is located and then retrieve such information.

The parameter "size" specifies the number of sectors that are to be loaded from the start byte offset which is provided by the parameter "offset." In other words, the quantity of data to be read beginning from the start byte offset can be specified.

The parameter "*p_dest" represents the destination pointer for the descriptor data. Before the descriptor data is read from the storage media, a designated location in a temporary memory area, such as a RAM, is assigned by the A/V controller 18 to store such data for subsequent retrieval. The beginning position of this designated location is represented by the destination pointer so as to allow the A/V controller 18 to retrieve the data.

The parameter "*cb" represents a pointer to a call back function to be used by the A/V file system 20 to signal to the program issuing the function call that processing is complete. For example, after the A/V controller 18 issues this function call to the A/V file system 20, the A/V controller 18 does not stay in contact with the A/V file system 20 to monitor its progress. When the A/V file system 20 has performed the desired function pursuant to the function call, the A/V file system 20 activates the call back function provided by the A/V controller 18 thereby signaling to the A/V controller 18 that the desired function has been performed.

For example, using the LoadDescriptor function call, the A/V controller 18 can direct the A/V file system 20 to retrieve selective data from an A/V data file stored on the storage media. Such A/V data file can represent, for example, a movie or other video presentation.

It is to be noted that some of the function calls discussed below use the same parameters as explained in connection with the LoadDescriptor function call. These same parameters represent the same information or perform the same function for these other function calls.

The StoreDescriptor function call is used to store descriptor information onto the storage media. A sample format for this function call is as follows:

StoreDescriptor (descID, type, offset, size, *p_data, *cb)

As mentioned above, the parameters "descID" and "type" provide information relate to a specified descriptor.

The parameter "offset" specifies the start byte offset value to be used for storing the descriptor data. Preferably, this offset value is a multiple of sectors. By specifying an "offset" value, a user is able to specify the position within the descriptor data where the storing should begin. For example, if the descriptor is of the type "object entry" and the object entry represents a movie, a user then can, with the aid of this function call, specify where to start storing additional descriptor information within the descriptor for that movie.

The parameter "size" specifies the number of sectors that are to be stored from the start byte offset which is provided by the parameter "offset." In other words, the quantity of data to be stored beginning from the start byte offset can be specified.

The parameter "*p_data" represents the destination pointer for the descriptor data. Before the descriptor data is stored onto the storage media, a designated location in a temporary memory area, such as a RAM, which is to contain the descriptor data to be stored is identified. The beginning position of this designated location is represented by the destination pointer so as to allow the A/V file system 20 to retrieve the data and then store such data onto the storage media.

It should be further noted that this function call also serves to create a new descriptor to store the specified descriptor information if the specified descriptor does not exist.

The DeleteDescriptor function call is used to delete descriptor information from the storage media. A sample format for this function call is as follows:

DeleteDescriptor (descID, type, *cb)

Preferably, depending on the "type" of descriptor that is specified, additional operations are performed which are consistent with this function call. For example, if the "type" of descriptor specified is "object entry," then the corresponding object related to this descriptor is accordingly deleted from the physical storage media and other descriptors, such as content list and performance list, which contain information about the corresponding object are similarly updated accordingly.

The CheckValidityOfID function call is used to check the validity of the specified ID value. A sample format for this function call is as follows:

CheckValidityOfID (descID, type, *cb)

The parameters "descID" and "type" are supplied so that the A/V file system 20 can verify the validity of the descriptor. If the descriptor corresponding to the specified "descID" already exists on the storage media, the call back function returns a value of "TRUE," otherwise "FALSE" is returned.

A second group of function calls is designed to handle larger files such as an A/V file. This group of function calls includes the Play function call, the Record function call, the Stop function call, the Pause function call, the Resume function call, and the GetCurrentLBA function call.

The Play function call is used to play a specified track or object loaded from the storage media. A sample format for this function call is as follows:

Play (chanID, objectID, inPoint, outPoint, speed, type, *cb)

The parameter "chanID" specifies which one of a number of channels is to be used to display the desired A/V data. In an exemplary embodiment where the 1394 cable 12 is used to transmit data, the 1394 cable 12 is able to accommodate one or more data streams simultaneously using multiple separate channels. In the case of protocol 1394, there is a maximum of sixty-three (63) channels. As a result, each recipient device is capable of displaying one of the data streams via a particular channel depending on how such recipient device is programmed. For example, if three movies are simultaneously transmitted by the 1394 cable 12 to a television, a computer (with a monitor) and a video-recorder, the television, the computer, and the video-recorder can each be programmed individually to show the first, second, and third movie respectively. Hence, by providing the parameter "chanID," the desired data are directed to be transmitted over a particular channel for showing on devices which have been programmed to receive that particular channel.

The parameter "objectID" is used to identify the particular object or file which contains the desired data to be transmitted via the channel specified by the parameter "chanID."

The parameter "speed" is used to specify the data transmission speed along the 1394 cable 12 for data transfer between the storage media and a display device. In the case of protocol 1394, the various alternative values that can be designated for the "speed" parameter include S100, S200 and S400.

The parameter "type" as used in connection with the Play function call specifies how the play operation is to be performed on an incremental quantitative basis. In one embodiment, the alternative categories that can be specified as "type" are byte count or time. The use of the parameter "type" will become clearer when discussed in connection with the parameters "inPoint" and "outPoint" below.

The parameter "inPoint" is used to specify the start position for the play operation. This start position can be specified in alternative ways depending on the parameter "type." If the parameter "type" is selected as count, then the start position can be specified using the number of sectors. It should be remembered that storage media such as hard disks are organized based on sectors. On the other hand, if the parameter "type" is selected as time, then the start position can be specified using time.

The parameter "outPoint" is used to specify the end position for the play operation. As discussed with the parameter "inPoint," the end position for the parameter "outPoint" can similarly be specified in alternative ways depending on the parameter "type."

The Record function call is used to record a track or object onto the storage media. A sample format for this function call is as follows:

Record (chanID, objectID, inpoint, type, *cb)

As mentioned above, in an exemplary embodiment where the 1394 cable is used to transmit data, the A/V file system 20 is capable of receiving one or more data streams from various devices via multiple separate channels. The parameter "chanID" is therefore used to identify which one of the multiple channels is to be recorded.

The parameter "objectID" is used to identify the object or file which is to be used to store the recorded data.

The parameter "type" serves an identical function as discussed in connection with the Play function call.

The parameter "inPoint" specifies the start position for the record operation. Similarly, the start position can be specified in alternative ways depending on the parameter "type" as discussed with the Play function call above.

The Stop function call is used to stop a track or object which may be under recording or playing. A sample format for this function call is as follows:

Stop (chanID, *cb, *lba)

Similarly, the parameter "chanID" is used to identify a specified channel so as to allow the A/V file system 20 to halt the record or play operation for that specified channel.

The parameter "*lba" is a pointer used to return the current byte position from the A/V file system 20 to the A/V controller 18.

The Pause function call is used to pause the play or record operation. A sample format for this function call is as follows:

Pause (chanID, *cb, *lba)

The parameter "chanID" is used to identify a specified channel so as to allow the A/V file system 20 to pause the play or record operation for that specified channel.

Similarly, the parameter "*lba" is a pointer used to return the current byte position from the A/V file system 20 to the A/V controller 18. The information provided by this pointer can be used for various purposes such as speeding up the Resume function call.

The Resume function call is used to restart the play or record operation. A sample format for this function call is as follows:

Resume (chanID, *cb)

The parameter "chanID" is used to identify a specified channel so as to allow the A/V file system 20 to deactivate the pause operation for that specified channel.

The GetCurrentLBA function call is used to retrieve the current offset or logical block address (in sector count) for the recorded track or object. A sample format for this function call is as follows:

GetCurrentLBA (chanID, *p_count)

The parameter "*p_count" represents a pointer which points to a location that stores the count value assigned by the A/V file system 20 after an object or track has been recorded. This count value is used to update the HMS table. The A/V controller 18 supplies the parameter "*p_count" so that when the A/V file system 20 calls back after the function is performed, *p_count will contain the count value. Using the count value stored in *p_count by the A/V file system 20, the A/V controller 18 is then able to calculate the logical block address and access any data point within the recorded object.

The second group of function calls further includes additional function calls which allow certain trick plays to be performed, including the FastForward function call, the SlowForward function call, the StepForward function call, the FastReverse function call, the SlowReverse function call, and the StepReverse function call.

The FastForward function call is used to fast forward a data stream being carried on a specified channel. A sample format for this function call is as follows:

FastForward (chanID, type, interval, repeat, *cb)

The parameter "chanID" is used to identify a specified channel so as to allow the A/V file system 20 to apply the fast forward operation to data being carried on that specified channel.

The parameter "type" is used to specify how the fast forward operation is to be performed. In an exemplary embodiment, the data is encoded in MPEG format. Under the MPEG format, each frame of the data can be independently encoded using one of three different encoding algorithms, namely, the intracoding (I) algorithm, the predictive (P) algorithm, and the bidirectional (B) algorithm. Hence, a data stream represented by the encoding algorithm being used on a frame-by-frame basis may look like this, IBB PBB IBB PBB. The fast forward operation is then performed based on how the frames in the data stream are to be processed, which is specified by the parameter "type". For example, using the data stream given above, the parameter "type" having a value of "I" indicates that only frames which use the intracoding algorithm are to be processed by the A/V file system 20 and all other frames are to be ignored. Similarly, the parameter "type" having a value of "IP" indicates that the first processed frame must use the intracoding algorithm, the next processed frame must use the predictive algorithm, and the third and fourth processed frames must use the intracoding and predictive algorithms respectively, and so on for the entire data stream. Other possible values for the parameter "type" include "IPP," "IPPP," "no B" and so on. Based on the disclosure provided herein, a person of ordinary skill in the art will understand how to implement the different values for the parameter "type."

The parameter "interval" is used to specify how much of a data stream is to be skipped before it is processed again. The value of this parameter is given in time; alternatively, the value can be given in the number of frames which can then be converted to time as necessary.

The parameter "repeat" is used to specify the duration of display of a frame or the number of times that a frame is to be displayed in a data stream. In other words, for a frame to be displayed, this parameter specifies how many times an individual frame is to be displayed during the fast forward operation. The repeated display of an individual frame affects the visual output quality of the data stream during the fast forward operation.

The SlowForward function call is used to forward a data stream being carried on a specified channel on a frame-by-frame or other specified incremental basis, with each frame being displayed at a specified frequency. A sample format for this function call is as follows:

SlowForward (chanID, repeat, increment, *cb)

Similarly, the parameter "chanID" is used to identify a specified channel so as to allow the A/V file system 20 to apply the slow forward operation to data being carried on that specified channel and the parameter "repeat" is used to specify the duration of display or the number of times a frame is to be displayed in a data stream. The parameter "increment" is used to specify the incremental value which determines how frames in the data stream are to be processed during the slow forward operation. For example, by specifying the parameter "increment" as "1", the data stream is forwarded on a frame-by-frame basis; or by specifying the parameter "increment" as "2", the data stream is forwarded by skipping every other frame.

The StepForward function call is used to forward a data stream being carried on a specified channel by one or more frames and then return the data stream to a pause state. A sample format for this function call is as follows:

StepForward (chanID, increment, *cb)

Likewise, the parameter "chanID" is used to identify a specified channel so as to allow the A/V file system 20 to apply the step forward operation to data being carried on that specified channel. The parameter "increment" is used to specify the incremental value which represents the number of frames that are to be skipped before returning the data stream to the pause state.

The three reverse operation function calls, Fast Reverse ( ), SlowReverse ( ) and StepReverse ( ), are similar to the three forward operation function calls described above, except that the direction of data stream movement caused by the three reverse operation function calls is backward as opposed to forward. The sample formats for the three reverse operation function calls are as follows:

FastReverse (chanID, type, interval, repeat, *cb)

SlowReverse (chanID, repeat, increment, *cb)

StepReverse (chanID, increment, *cb)

The various parameters for the three reverse operation function calls are similar to the parameters described in connection with the three forward operation function calls.

Referring to FIG. 1, it should also be noted that the API of the present invention can be implemented to provide an interface between the SBP-2 controller 22 and the A/V file system 20. Following the description as provided herein, a person of ordinary skill in the art will know of ways, techniques, and methods to implement the present invention as an interface between the SBP-2 controller 22, as well as other devices, and the A/V file system 20.

As mentioned above, packets transported using the SBP-2 protocol are delivered to the SBP-2 controller 22 for processing. If the SBP-2 controller 22 determines that the A/V file system 20 is to be invoked, the SBP-2 controller 22 similarly uses the appropriate API as described above to interact with the A/V file system 20.

The function calls of the API under the present invention are capable of passing input and output parameters. It should be understood that these parameters can be passed in various different manners. For example, these parameters can be passed directly in a function call; alternatively, these parameters can also be passed via use of pointers. A person of ordinary skill in the art will know of ways and methods to implement the passing of parameters.

In an exemplary embodiment, the API of the present invention is implemented via software using C and C++. However, it should be understood that a person of ordinary skill in the art will know of additional computer programming languages as well as other ways, techniques, and methods to implement the present invention.

A number of advantages is realized by the API of the present invention. For example, the API supports the handling of large and small files by the A/V file system 20. A number of function calls of the API, such as the LoadDescriptor( ), StoreDescriptor( ) and the DeleteDescriptor( ), are designed to handle descriptors, while other function calls, such as Play( ), Record( ), Stop( ), Pause( ) and Resume( ), are designed to handle A/V files. As previously mentioned, a descriptor is a relatively small file typically used to store and provide information on the properties of a specific object or a list of objects. By having function calls that are designed to handle descriptors and A/V files, the A/V file system is then capable of handling both large and small files thereby allowing A/V data files and other types of data files to be processed in an efficient manner.

The API also supports a variety of features typically offered by an A/V file system 20, such as scalability to large disks, directory structures and delete, add and record operations. For example, the API includes function calls which use the objectID parameter and the descID parameter thereby allowing the implementation of scalable disks and directory structures. Also, the API includes function calls such as DeleteDescriptor( ), StoreDescriptor( ) and Record( ) thereby allowing the implementation of delete, add and record operations.

Moreover, the API allows trick play operations to be performed by the A/V file system 20. For instance, the API includes function calls such as FastForward( ), SlowForward( ), StepForward( ), FastReverse( ), SlowReverse( ) and StepReverse( ).

Furthermore, the API allows the A/V file system 20 to provide additional capabilities. For instance, the API allows several A/V data streams or the same A/V data stream to be operated on in a concurrent manner in a number of operations including Play( ), Record( ), Stop( ), Pause( ) and Resume( ). This is made possible by the use of the "chanID" and/or "objectID" parameters in a function call. As discussed above, in an exemplary embodiment where the 1394 cable 12 is used to transmit data, the 1394 cable 12 is able to accommodate one or more data streams simultaneously using multiple separate channels. As a result, each recipient device is capable of displaying one of the data streams via a particular channel depending on how such recipient device is programmed.

In one example, if three different movies are concurrently transmitted by the 1394 cable 12 to a television, a computer (with a monitor) and a video-recorder respectively, the API of the present invention can be used to control the three different movies independently.

In an alternative example, the same movie can be shown concurrently on the television, the computer and the video-recorder. Furthermore, the television, the computer and the video-recorder can be controlled in such a way that the same movie can be playing on each of these devices at different times. In other words, the three devices can be independently playing the same movie at the same time. Hence, by providing the parameters "chanID" and "objectID," different or the same data can be directed to be transmitted independently over different channels in a concurrent manner.

Moreover, the API supports record and play operations starting from within an A/V file. For instance, the function calls, Play( ) and Record( ), both accept as an input parameter the parameter, inpoint, which specifies the start position of the desired operation within the A/V file. Another parameter, outPoint, is used by the Play( ) function call to specify the end position of the operation within the A/V file. By having function calls that are capable of initiating an operation starting from within an A/V file, the performance of random data access is improved.

In addition, the API optimizes disk access. As mentioned above, different function calls of the API are designed for descriptors and A/V files respectively. By providing the capability to handle descriptors and A/V files separately, disk access is optimized and the retrieval and handling of data is improved.

Finally, the API permits devices each capable of handling a different type of data to communicate with an A/V file system. More specifically, the API can be used by an A/V controller and a SBP-2 controller to interface with the A/V file system using the 61883 protocol and the SBP-2 protocol respectively.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An audio/video filing system for handling and organizing audio/video data comprising:
   a storage layer; and
   an application programming interface residing in the audio/video filing system, said application programming interface having a first interface that controls transfer of information for handling audio/video data files and non-audio/video files at said storage layer, said application programming interface adapted to select a first set of function calls to manipulate said storage layer when an audio/video file is detected and to select a second set of function calls to manipulate said storage layer when a non-audio/video file is detected.

2. The audio/video filing system according to claim 1, further comprising:
   a second interface which controls transfer of information between a controller capable of handling asynchronous data.

3. The audio/video filing system according to claim 2, wherein said controller is capable of processing commands transmitted using protocol 61883.

4. The audio/video filing system according to claim 3, wherein said audio/video file is transmitted using protocol 61833 in an isochronous manner and control components of the are transmitted in an asynchronous manner.

5. The audio/video filing system according to claim 2, wherein said controller is a SBP-2 controller.

6. The audio/video filing system according to claim 5, wherein said SBP-2 controller is capable of processing commands transmitted using serial-bus-protocol-2.

7. The audio/video filing system according to claim 6, wherein said commands are transmitted using serial-bus-protocol-2 in an asynchronous manner.

8. The audio/video filing system according to claim 1, wherein transfer of information to and from said audio/video filing system is independent of said storage layer implementation.

9. The audio/video filing system according to claim 2, wherein control of said transfer of information to and from said controller is independent of internal implementation of said controller.

10. The audio/video filing system according to claim 1, wherein said audio/video data files is smaller than said non-audio/video files.

11. The audio/video filing system according to claim 1, wherein said second set of function calls enable said audio/video file system to play or record a plurality of audio/video data files concurrently.

12. The audio/video filing system according to claim 11, wherein said second set of function calls enable said audio/video file system to play or record said plurality of audio/video data files concurrently by using a channel ID parameter and an object ID parameter.

13. The audio/video filing system according to claim 1, wherein said second set of function calls enable said audio/video file system to play and record an audio/video data stream concurrently.

14. The audio/video filing system according to claim 13, wherein said second set of function calls enable-said audio/video file system to play and record said audio/video data stream concurrently by using a channel ID parameter and an object ID parameter.

15. The audio/video filing system according to claim 1, wherein one or more of said plurality of function calls are designed to allow said audio/video file system to initiate a play or record operation starting from within an audio/video file.

16. The audio/video filing system according to claim 15, wherein said second set of function calls enable said audio/video file system to initiate a play or record operation starting from within said audio/video file by using an offset parameter.

17. The audio/video filing system according to claim 1, wherein said second set of function calls enable said audio/video file system to optimize disk access.

18. The audio/video filing system according to claim 17, wherein said second set of function calls enable said audio/video file system to optimize disk access by designating a first group of function calls to handle a first type of file and a second group of function calls to handle a second type of file.

19. The audio/video filing system according to claim 18, wherein said first type of file is a non-audio/video file; and wherein said second type of file is an audio/video file.

20. The audio/video filing system according to claim 1, wherein said second set of function calls enable said audio/video file system to perform a plurality of trick operations with a data stream.

21. The audio/video filing system according to claim 20, wherein said plurality of trick operations includes a plurality of forward operations.

22. The audio/video filing system according to claim 21, wherein said plurality of forward operations includes a fast-forward operation, a slow-forward operation, and a step-forward operation.

23. The audio/video filing system according to claim 20, wherein said plurality of trick operations includes a plurality of reverse operations.

24. The audio/video filing system according to claim 23, wherein said plurality of reverse operations includes a fast-reverse operation, a slow-reverse operation, and a step-reverse operation.

25. An audio/video file system capable of handling and organizing audio/video data comprising:
an application programming interface residing in the audio/video filing system and adapted to interface with a plurality of controllers and to select a first plurality of function calls to manipulate said audio/video filing system when a first file type is detected and to select a second plurality of function calls to manipulate said audio/video filing system when a second file type is detected; said first plurality of function calls including:
a load function call designed to cause retrieval of descriptor information from a storage medium;
a store function call designed to cause storing of said descriptor information onto said storage medium;
a delete function call designed to cause deletion of said descriptor information from said storage medium; and
said second plurality of function calls including:
a play function call designed to cause a specified file to be played; a record function call designed to cause specified data to be recorded; and
a stop function call designed to cause a play or record operation to be stopped.

26. The audio/video filing system according to claim 25, wherein said first plurality of function calls is designed to handle a first type of file; and wherein said second plurality of function calls is designed to handle a second type of file.

27. The audio/video filing system according to claim 26, wherein said first type of file is a non-audio/video file; and wherein said second type of file is an audio/video file.

28. The audio/video filing system according to claim 25, wherein said first plurality of function calls further includes:
a validity function call designed to verify validity of a specified descriptor; and
wherein said second plurality of function calls further includes:
a pause function call designed to cause a play or record operation to be paused;
a resume function call designed to cause a previously paused operation to resume; and
an address retrieval function call designed to determine a logical block address of said specified file during a play or a record operation.

29. The audio/video filing system according to claim 25, wherein said second plurality of function calls includes:
a plurality of function calls designed to cause forward operations to be performed; and
a plurality of function calls designed to cause reverse operations to be performed.

30. The audio/video filing system according to claim 29, wherein said second plurality of function calls are designed to cause forward operations to be performed and include:
a fast-forward function call;
a slow-forward function call; and
a step-forward function call.

31. The audio/video filing system according to claim 29, wherein said second plurality of function calls are designed to cause reverse operations to be performed include:
a fast-reverse function call;
a slow-reverse function call; and
a step-reverse function call.

32. The audio/video filing system according to claim 25, wherein said application programming interface is capable of being used by a controller capable of handling isochronous and asynchronous data to communicate with said audio/video file system.

33. The audio/video filing system according to claim 32, wherein said controller is an audio/video controller.

34. The audio/video filing system according to claim 32, wherein said application programming interface enables a second controller capable of handling asynchronous data to communicate with said audio/video file system.

35. The audio/video filing system according to claim 34, wherein said second controller is a SBP-2 controller.

36. The audio/video filing system according to claim 28, wherein said specified descriptor is an object descriptor.

37. The audio/video filing system according to claim 28, wherein said specified descriptor is a content list.

38. The audio/video filing system according to claim 28, wherein said specified descriptor is a performance list.

39. The audio/video filing system according to claim 28, wherein said specified descriptor is an EMS table.

40. The audio/video filing system according to claim 28, wherein each of said first and second plurality of function calls is capable of passing a plurality of parameters.

41. The audio/video filing system according to claim 40, wherein said plurality of parameters that is capable of passed by said load function call includes a descriptor ID parameter, a type parameter, an offset parameter, a size parameter a data_location parameter, and a call_back parameter.

42. The audio/video filing system according to claim 40, wherein said plurality of parameters that is capable of being passed by said store function
  call includes a descriptor ID parameter, a type parameter, an offset parameter, a size parameter, a data_location parameter, and a call_back parameter.

43. The audio/video filing system according to claim 40, wherein said plurality of parameters that is capable of being passed by said delete function call includes a descriptor ID parameter, a type parameter, and a callback parameter.

44. The audio/video filing system according to claim 40, wherein said plurality of parameters that is capable of being passed by said play function call includes a channel ID parameter, an object ID parameter, a start_position parameter an_end position parameter, a speed parameter, and a call_back parameter.

45. The audio/video filing system according to claim 40, wherein said plurality of parameters that are capable of being passed by said record function call include a channel ID parameter, an object ID parameter, a start_position parameter, a type parameter, and a call_back parameter.

46. The audio/video filing system according to claim 40, wherein said plurality of parameters that is capable of being passed by said stop function call includes a channel ID parameter a call_back parameter, and a logical_byte_address parameter.

47. The audio/video filing system according to claim 40, wherein said plurality of parameters that is capable of being passed by said pause function call includes a channel ID parameter, a call_back parameter, and a logical_byte_address parameter.

48. The audio/video filing system according to claim 40, wherein said plurality of parameters that is capable of being passed by said resume function call includes a channel ID parameter and a call_back parameter.

49. The audio/video filing system according to claim 40, wherein said plurality of parameters that is capable of being passed by said address retrieval function call includes a channel ID parameter and a count parameter.

50. The audio/video filing system according to claim 40, wherein said plurality of parameters that is capable of being passed by said validity function call includes a descriptor ID parameter, a type parameter and a call_back parameter.

51. The audio/video filing system according to claim 30, wherein said fast-forward function call is capable of passing a plurality of parameters including a channel ID parameter, a type parameter, an interval parameter, a repeat parameter, and a call_back parameter.

52. The audio/video filing system according to claim 30, wherein said slow-forward function call is capable of passing a plurality of parameters including a channel ID parameter, a repeat parameter, an increment parameter and a callback parameter.

53. The audio/video filing system according to claim 30, wherein said step-forward function call is capable of passing a plurality of parameters including a channel ID parameter, an increment parameter and a call_back parameter.

54. The audio/video filing system according to claim 31, wherein said fast-reverse function call is capable of passing a plurality of parameters including a channel ID parameter, a type parameter, an interval parameter, a repeat parameter, and a call_back parameter.

55. The audio/video filing system according to claim 31, wherein said slow-reverse function call is capable of passing a plurality of parameters including a channel ID parameter, a repeat parameter, an increment parameter and a call_back parameter.

56. The audio/video filing system according to claim 31, wherein said step-reverse function call is capable of passing a plurality of parameters including a channel ID parameter, an increment parameter and a call_back parameter.

57. A method for providing communication with an audio/video file system, comprising steps of:
  providing a first interface residing in the audio/video filing system, the first interface controlling transfers of information between said audio/video system and a first controller capable of handling isochronous and asynchronous data;
  using a first plurality of function calls to manipulate said audio/video filing system when a descriptor file is detected by said first interface and a second plurality of function calls to manipulate said audio/video filing system when an audio/video file type is detected by said first interface; and
  providing a second interface residing in the audio/video filing system, the second interface controlling transfers of information between said audio/video system and a second controller capable of handling asynchronous data.

58. The method according to claim 57, wherein said signals transferred between said audio/video system and said first controller are independent of internal implementation of said first device; and wherein said signals transferred between said audio/video system and said second controller are independent of internal implementation of said second device.

* * * * *